United States Patent [19]
Jarczynski

[11] Patent Number: 5,091,666
[45] Date of Patent: Feb. 25, 1992

[54] STATOR COOLING SYSTEM FOR ELECTRICAL MACHINERY

[75] Inventor: Emil Jarczynski, Scotia, N.Y.

[73] Assignee: General Electric Company, Schenectady, N.Y.

[21] Appl. No.: 539,829

[22] Filed: Jun. 15, 1990

[51] Int. Cl.$^5$ ............................................. H02K 9/00
[52] U.S. Cl. ........................................ 310/54; 310/52; 310/64; 310/59
[58] Field of Search ............... 310/52, 54, 59, 64, 310/65, 57, 58

[56] References Cited

U.S. PATENT DOCUMENTS

| | | |
|---|---|---|
| 4,208,597 | 6/1980 | Mulach et al. .................. 310/59 |
| 4,360,750 | 11/1982 | Pohl ................................. 310/54 |
| 4,644,210 | 2/1987 | Meisner et al. ................. 310/54 |

Primary Examiner—Steven L. Stephan
Assistant Examiner—Matthew Nguyen
Attorney, Agent, or Firm—Nixon & Vanderhye

[57] ABSTRACT

Electrical machines, such as electrical power generators, motors and the like, include an especially adapted cooling system for removing heat generated in the electromagnetic core during operation. The cooling system preferably includes a number of thermally conducting laminations interposed between predetermined ones of the core laminations that form the electromagnetic core. The thermally conducting laminations thereby establish a preferential solid path of thermal conductance so that heat generated in one region of the core may be conducted to another region of the core. Preferably, the thermally conducting laminations are formed of a nonmagnetic material. A thermal collector having at least comparable thermal conductivity properties as the thermally conducting laminations is provided at the othe region of the core so as to collect heat conducted thereto by the thermally conducting laminations. Coolant passageways are defined by the thermal collector so that circulation of a coolant fluid (e.g., a coolant liquid) therewithin will remove the collected heat and thereby cool the core.

34 Claims, 2 Drawing Sheets

STATOR COOLING SYSTEM FOR ELECTRICAL MACHINERY

CROSS-REFERENCE TO RELATED APPLICATIONS

This application may be deemed to be related to co-pending U.S. patent application Ser. No. 539,825, filed on even date herewith in the name of the same inventor and entitled "Liquid Cooling the Rotor of an Electrical Machine", the entire content of the same being expressly incorporated hereinto by reference.

FIELD OF INVENTION

The present invention generally relates to electrical machinery, for example, electrical power generators, drive motors, and the like, having a rotor and a stator. More specifically, the present invention relates to an especially adapted cooling system for the stator of electrical machinery that enables the same to be operated at lower rated temperatures (and thus higher power densities) as compared to electrical machinery having comparable electromagnetic components.

BACKGROUND OF THE INVENTION

The electromagnetic components of rotating electrical machinery generate heat which must be removed for normal operation. Typically, larger electrical machinery, such as electrical service generators or drive motors, are cooled by introducing a coolant fluid internally to the stator of the machine. For example, coolant fluid has been introduced internally into the stator of larger electrical machinery either by incorporating fluid ducts physically within the electromagnetic stator core, and circulating a coolant fluid therethrough, or by introducing a coolant fluid directly into hollow electrical conductors.

Smaller sized motors, such as integral or fractional horsepower motors, or larger sized motors that can be completely enclosed and thereby isolated from their environment of use, have sometimes been cooled externally by allowing air as a coolant to flow over the outer machinery frame. The forced flow of air over the external frame of the machinery necessitates that relatively large sized air passages are needed thereby mitigating against miniaturization.

Some commercially available drive motors, such as the totally enclosed fan cooled induction motors that have been sold by General Electric Company for more than one year prior to the filing of the present patent application, have been cooled by means of forced air flowing over the outer, and relatively low thermally conductive, frame of the motor to remove internally generated heat. Some of these previously sold motors have also included copper laminations within the stator core for purposes of providing a path of heat conductance to an outer region of the motor. As noted briefly above, however, these machines were provided with only relatively low thermal conductivity air-cooled frames, and hence did not include liquid-cooled high conductivity thermal collectors in thermal communication with the copper laminations.

The design of an adequate cooling system for high power density electrical machinery presents its own significant problems. In this regard, it is usually desired to have a high power density electrical machine that is both physically compact, yet has maximum power output. Various techniques have been employed in the past to maximize power output, such as by increasing the magnetic flux density, increasing the rate of cutting magnetic flux with conductors (high frequency), and increasing the rate of current flow in the conductors. As can be appreciated, all of these techniques contribute to the generation of significant internal heat within the machine that must be removed for normal operation.

In those instances where the size and/or weight of the electrical machine is not critical, a significant amount of the overall machine structure can be dedicated to the cooling system (e.g., the cooling ducts and passageways, peripheral support equipment, and the like) without detrimentally affecting the machine's performance characteristics. However, in high power density electrical machines, the specific performance ratings of the internal components must be maximized, while minimizing the available space for heat removal. Thus, cooling systems having significant spatial requirements cannot usually be tolerated for high power density electrical machinery. These competing design criteria—i.e., increased power density/decreased spatial requirements—must also be considered in the context of maintaining acceptable temperatures for reasonable component life and thermally induced stresses.

Previous high power density machinery represented by the High Speed/High Frequency Generators and the F-18 Generators sold by General Electric Company more than one year prior to the filing date of this application, have used liquid-cooled outer frames as replacements for coolant fluid passageways internally of the stator. However, the poor thermal conductance through both the armature magnetic core and the structural frame of these prior art generators create a significant temperature differential between the armature conductor and the cooling fluid. The conduction path thus limits the amount of heat that can be removed for a given maximum allowable internal temperature. As a result, the inefficiencies of the cooling system limit the power densities that may be achieved.

What has been needed, therefore, is a cooling system that allows the power output of electrical machines to be maximized, yet is conducive to machine miniaturization. It is towards attaining that need that the present invention is directed.

SUMMARY OF THE INVENTION

Broadly, the present invention is directed to especially adapted cooling systems for stators of electrical machines, such as electrical power generators, motors and the like, whereby heat that is generated in the electromagnetic stator core during operation is efficiently removed. The cooling systems of the present invention are embodied in "low profile" structures—i.e., structures that perform their intended functions within minimal spatial requirements—in the form of solid (quite possibly nonmagnetic) radially disposed thermal conductance paths physically located within the electromagnetic core of the electrical machine. These solid radial cooling paths are, moreover, spaced-apart from one another along the longitudinal axis of the machine's core and are in thermally conducting communication with a fluid-cooled thermal collector having essentially the same thermal conductance properties as the solid radial cooling paths.

The solid radial cooling paths are fabricated from a material having significantly better thermal conductance properties as compared to the magnetic material forming the electromagnetic stator core of the machine. For example, if the core is fabricated from conventional magnetic silicon steel, then the solid thermal conductance paths may be fabricated from copper. The selection of particular materials, however, depends upon the particular performance characteristics that may be desired for particular end-use applications. Suffice it to say here that those skilled in this art will be capable of selecting suitable materials for both the electromagnetic stator core and the solid radial thermal transfer paths according to the present invention.

The cooling systems of the present invention are most preferably employed in conjunction with electromagnetic cores having a number of coaxially compressively stacked annular core laminations (sometimes referred to as "punchings" in art parlance as they may be fabricated from relatively thin (e.g., typically about 0.014" in thickness) electromagnetic metal (e.g., silicon steel) sheet stock using punch and die fabrication techniques). The solid thermally conducting paths will therefore be established by a number of similarly configured (e.g., similar annular geometry and thickness), but relatively more highly thermally conductive sheet metal laminations interposed between predetermined respective adjacent pairs of core laminations that form the electromagnetic stator core.

The thermal collector is preferably embodied in a generally tubular sleeve that is in thermally conductive contact with the outer peripheral edges of the thermally conductive laminations. Important to the present invention, the thermal collector is formed from a material that exhibits as least comparable (or better) high thermal conductivity properties as compared to the thermally conductive laminations. Most preferably, the thermal collector is formed of the same highly thermally conductive material as the thermally conductive laminations. The thermal collector is, moreover, fluid-cooled by a coolant fluid circulating within passageways defined in the thermal collector.

The thermally conductive laminations thereby establish a preferential solid path of thermal conductance so that heat generated in one (interior) region of the stator core may be conducted to another (exterior) region of the stator core where the thermal collector is located. The conducted heat is thus efficiently collected by the thermal collector since the collector and thermally conductive laminations have essentially the same thermal conductance properties. Circulation of the coolant fluid through the thermal collector will thereby remove the collected heat therefrom and thus cool the electromagnetic stator core.

The thermally conductive laminations are, moreover, relatively thin as compared to the magnetic core laminations. That is, according to the present invention, the thermally conductive laminations are sufficiently thin so that magnetic flux perpendicular to the plane of the laminations will not generate additional heat. Most preferably, the thermally conductive laminations will be on the order of about the same thickness (or less) as compared to the thickness of the core laminations.

The relatively thin thermally conductive laminations will thereby allow electrical machinery in which the present invention is incorporated to operate in a high frequency electromagnetic field without incurring significant additional heating and power losses. That is, the relatively thin nonmagnetic thermally conductive laminations have the advantage of presenting a small profile to magnetic flux entering the core in the plane parallel to the laminations—that is, the fundamental flux crossing the air gap between the rotor and stator. The eddy currents and resultant additional heating produced in these relatively thin thermally conductive laminations will be minimal, occurring primarily at the innermost edges thereof adjacent the rotor, where the flux spreads axially across the air gap to enter the magnetic core laminations of the stator. Once the magnetic flux is entrained in the magnetic stator core laminations, however, it will be parallel to the nonmagnetic thermally conductive laminations, and thus no further significant additional heat will be generated thereby.

Further aspects and advantages of this invention will become more clear after careful consideration is given to the following detailed description thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 1 is a schematic diagram showing a representative electrical power generator in which the cooling system of the present invention may be employed; and FIG. 2 is a schematic cross-sectional perspective view of a stator used in the electrical power generator depicted in accompanying FIG. 1, and particularly showing the cooling structures of the present invention.

DETAILED DESCRIPTION OF THE PREFERRED EXEMPLARY EMBODIMENTS

Figure 1:
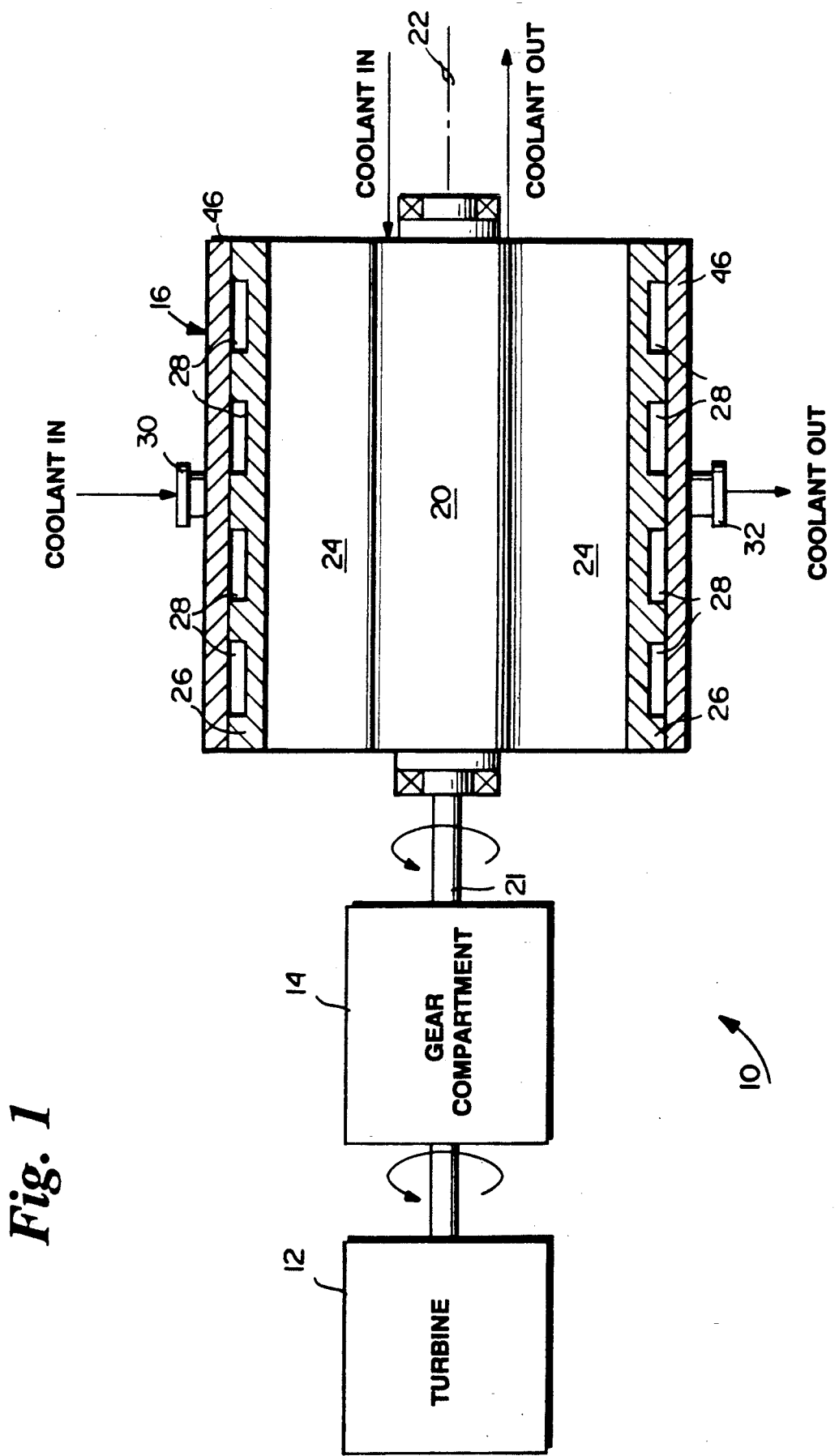

Accompanying FIG. 1 diagrammatically represents an electrical power generating system 10 that may advantageously employ the cooling structures of the present invention. It should be understood, however, that the system 10 shown in FIG. 1 merely represents one particularly preferred form of an electrical machine in which the cooling structures of the present invention may be embodied. Thus, the cooling structures of the present invention could be embodied in virtually any electrical machine having a rotor and a stator which require heat dissipation, for example, electrical drive motors and the like.

The electrical power generating system 10 shown in FIG. 1 generally includes a turbine section 12 (which may advantageously be powered by pressurized fluid, for example, steam), a gear compartment 14 (which may include gear reducer and power transfer mechanisms), and an electrical power generator 16 (which responsively generates electrical power). As is well known, the electrical generator 16 includes a rotor 20 (coupled to the gear compartment 14 via shaft 21 so as to rotate in a preselected direction about its longitudinal axis 22), and a stator 24 in surrounding relationship to the rotor 20.

The gear compartment 12 is not absolutely necessary and, in fact, is not desirable when the generator 16 is of the high speed/high frequency variety. In such situations, the generator 16 is most preferably directly coupled to the turbine 12.

A thermal collector 26 is sleeved to the electromagnetic stator core 24 and defines a number of coolant fluid passageways 28 therein. These passageways 28 are, in turn, fluid-connected to a coolant inlet 30 and coolant outlet 32 so as to allow a coolant fluid to circulate within the passageways 28 and thereby remove heat conducted to the thermal collector 26. To enhance the cooling of the generator 16, the rotor 20 may also be provided with a circulating flow of coolant fluid, as is described in greater detail in the above-referenced co-pending U.S. patent application Ser. No. 539,825.

Figure 2:
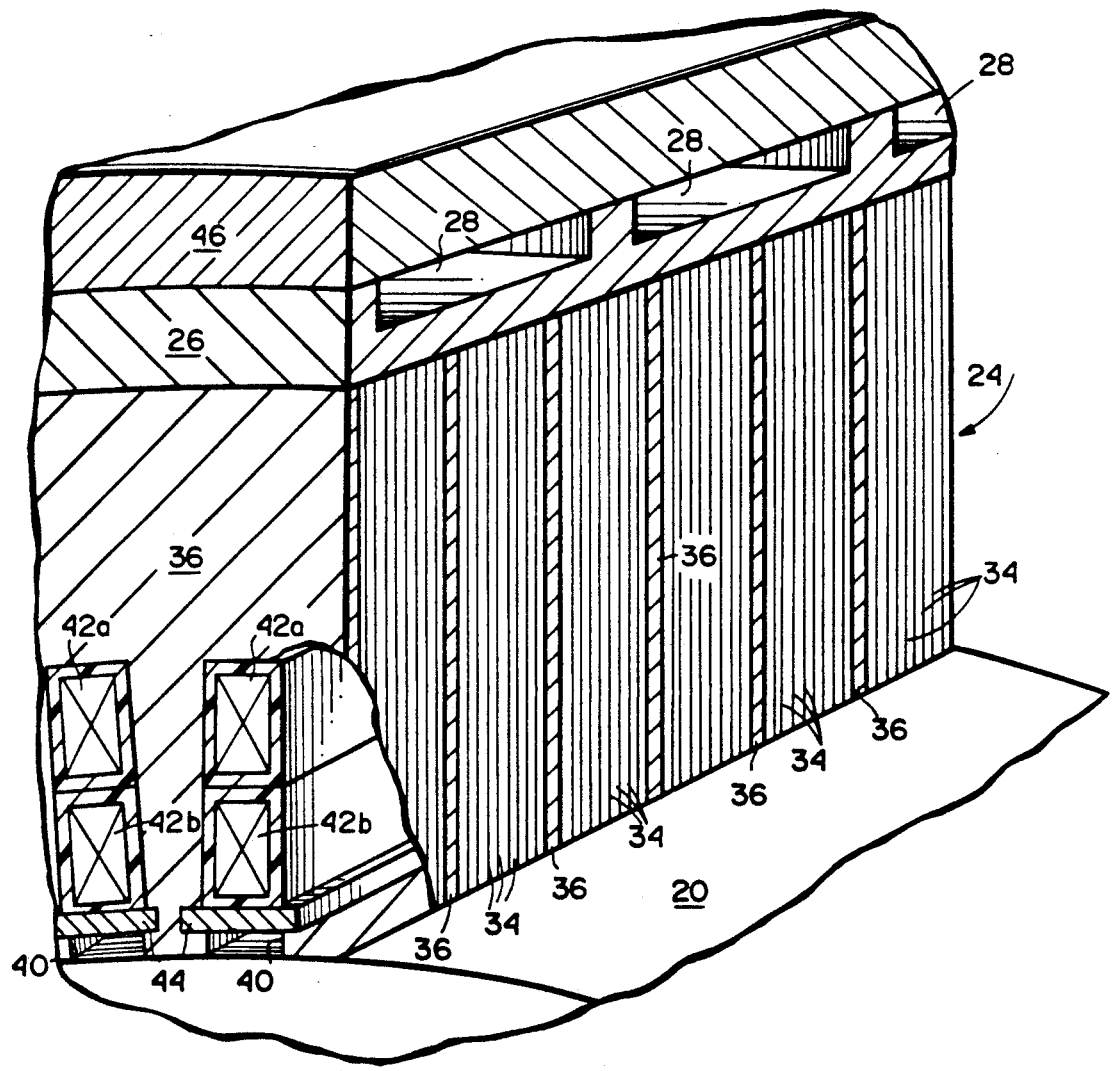

A more detailed partial cross-sectional view of the stator 24 is shown in accompanying FIG. 2. As is seen, the stator 24 includes an electromagnetic composite core comprised of a number of core laminations (some of which are identified in FIG. 2 by reference numeral 34) coaxially stacked in adjacent contact with one another relative to the longitudinal axis 22 (see FIG. 1). According to the present invention, relatively more highly thermally conductive laminations 36 (as compared to the core laminations 34) are interposed between preselected adjacent pairs of core laminations 34 at selected axially spaced-apart intervals (i.e., along axis 22).

The thermally conductive laminations 36 are shown in accompanying FIG. 2 as being interposed between core laminations 34 at essentially equal intervals—for example, one thermally conductive lamination 36 interposed between every nth core lamination 34. However, the thermally conductive laminations 36 may also be interposed in the core 24 at unequal intervals, particularly if there are localized regions along the axial length of the core 24 that require special cooling considerations. In addition, more than one thermally conductive plate 36 may be interposed between adjacent ones of the core laminations 34 as may be needed for specific cooling applications.

The total number of thermal conductive laminations 36 that is used for a given electrical machine is a matter of optimization for desired machine performance characteristics. For example, it has been determined that a composite stator core 24 having one thermally conductive plate 36 fabricated from an about 0.014" thick copper sheet, for every nine core laminations 34 fabricated from an about 0.014" thick silicon steel sheet (i.e., 10% copper thermally conductive laminations/90% silicon steel core laminations), the thermal conductance of the composite core 24 will be more than doubled (i.e., resistance to heat flow will be halved) as compared to a core 24 composed solely of silicon steel core laminations 34.

The composite core 24 (i.e., composed of both the electromagnetic core laminations 34 and the relatively more highly thermally conductive laminations 36) defines a number of longitudinally extending coil slots 40 in facing relationship to the rotor 20. The coil slots 40 receive field coil assemblies 42a, 42b and their associated insulation. The coil assemblies 42a, 42b are held in position via respective transverse wedges 44.

The thermal collector 26 must exhibit at least comparable (or better) thermal conductivity properties as the thermal conductive laminations 36. Most preferably, the thermal collector 26 is formed of the same relatively highly thermally conductive material as the thermal conductive laminations 36 in the stator core 24. For example, the conductive laminations 36 and the thermal collector 26 may each be advantageously made of copper. Alternatively, the thermal collector 26 and the thermally conductive laminations 36 may be formed of different materials provided that such different materials exhibit essentially comparable thermal conductance properties relative to one another (e.g., aluminum and copper, respectively). The selection of particular materials may be made by those skilled in this art in dependance upon the thermal conductive performance characteristics that are desired.

The thermal collector 26 may, in turn, be surrounded by the outer structural frame 46 of the generator 16. In this regard, the thermal collector 26 will include a number of longitudinally spaced-apart channels forming, collectively with the outer structural frame 46, the coolant fluid passageways 28 that extend circumferentially relative to the stator core 24. Alternatively, the coolant fluid passageways 28 may be formed entirely within the thermal collector 26.

Thermal contact between the composite stator core 24 and the thermal collector 26 is preferably accomplished by an interference fit. That is, the inner diameter of the thermal collector 26 may be sized so as to be slightly smaller than the outer diameter of the composite stator core 24. The thermal collector 26 may thereby be thermally expanded and sleeved over the core 24. Upon cooling, the slightly smaller inner diameter of the thermal collector 26 will result in an interference fit with the outermost edge of the thermally conductive laminations 36 in the core 24.

In use, heat generated in the inner region of the core 24 (e.g., heat generated by the coil assemblies 42a, 42b) near the rotor 20 will be preferentially conducted towards the relatively more highly thermally conductive laminations 36. The heat will then be radially conducted through the laminations 36 and to the thermal collector 26. Heat collected by the thermal collector 26 is then transferred to the coolant fluid circulating within the passageways 28 and is thereby removed. In such a manner, heat energy that is continually preferentially conducted to the thermal collector 26 along the solid thermally conductive paths 36 will be continually removed via the coolant fluid. As such, the core 24 is efficiently cooled.

Since the coolant fluid is physically isolated from the current carrying coils, the selection of a particular coolant fluid is a matter of convenience, availability, thermal performance and/or compatibility with the materials in which it will come in contact. Preferably, however, the coolant fluid is a liquid, with water being especially preferred.

Several advantages ensue from the present invention as described above. For example, the relatively highly thermal conductive laminations 36 can be made using the same fabrication techniques for making the core laminations 34, such as by punching the laminations from sheet metal of appropriate thickness using a punch and die set, cutting sheet metal stock with a laser, or by electrical discharge machining. The laminations 34 and 36 may be collectively assembled using conventional core stacking practices. As a result, few (if any) special considerations are presented in producing the composite cores 24 thereby minimizing production costs.

The cooling system of the present invention has been described above with particular reference to its use in conjunction with a stator of an electrical machine (e.g., a generator 16). It should be appreciated that such a description represents a particularly preferred embodiment of the present invention. Thus, the principles of the present invention could be embodied in the rotor of an electrical machine if deemed desirable and/or necessary.

Therefore, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrical machine comprising a rotor, a stator having a magnetic core, and a cooling system for cooling said stator, wherein said cooling system comprises:

means establishing a number of radially disposed solid thermal conductance paths of preselected thermal conductivity spaced apart from one another along a longitudinal axis of said core for radially preferentially conducting heat from an inner region of said core to an outer region thereof, wherein said magnetic core is composed of a number of coaxially stacked core laminations each formed of a magnetic material, and wherein said solid thermal conductance paths include a number of nonmagnetic thermal conducting laminations formed of a material exhibiting said preselected thermal conductivity, said thermal conducting laminations being interposed between predetermined ones of said core laminations;

shell means surrounding said core in thermal conducting communication with said outer region thereof for collecting heat conducted from said core inner region by means of said solid thermal conductance paths; and a fluid coolant passageway defined by said shell means for allowing a coolant fluid to circulate therethrough and remove said collected heat, whereby said core is cooled.

2. An electrical machine as in claim 1, wherein said shell means has at least essentially comparable or better thermal conductivity as compared to said preselected thermal conductivity of said solid thermal conductance paths.

3. An electrical machine as in claim 1, wherein said number of thermal conducting laminations are interposed at equal intervals between said predetermined ones of said core laminations.

4. An electrical machine as in claim 1, wherein said number of thermal conducting laminations are interposed at unequal intervals between said predetermined ones of said core laminations.

5. An electrical machine as in claim 3 or 4, wherein several of said thermal conducting laminations are coaxially disposed adjacent to one another and are interposed between said predetermined ones of said core laminations.

6. An electrical machine as in claim 1, wherein said solid thermal conductance paths are nonmagnetic.

7. An electrical machine as in claim 1 or 6, wherein each said solid thermal conductance paths and said shell means are fabricated from the same nonmagnetic material.

8. An electrical machine as in claim 7, wherein said nonmagnetic material is copper.

9. In an electrical machine having an axially extending electromagnetic core comprised of a dense plurality of coaxially stacked electromagnetic laminations, wherein said electromagnetic core defines axially extending coil slots near one of its circumferential edge regions, and includes coil assemblies operatively associated within respective ones of said defined coil slots, the improvement comprising cooling means for cooling said electromagnetic core during operation, said cooling means comprising:

a number of solid nonmagnetic thermal conducting laminations coaxially interposed between predetermined ones of said electromagnetic laminations of said core, and having a thermal conductance greater than said electromagnetic laminations to thereby provide a corresponding number of solid thermal conductive paths;

a thermal collector having at least essentially comparable or better thermal conductance as compared to the thermal conductance of said nonmagnetic thermal conducting laminations, said thermal collector being in contact with a radial edge region of each said nonmagnetic thermal conducting plate so as to be in thermally conducting communication therewith; and fluid coolant ports defined in said thermal collector through which a coolant fluid circulates to cool said thermal collector; wherein said solid nonmagnetic thermal conducting laminations establish radial paths of thermal conductance such that heat generated within said core during operation of said electrical machine is preferentially conducted along with said radial paths to said thermal collector and removed by means of said circulating coolant fluid.

10. In an electrical machine as in claim 9, the improvement wherein said number of solid nonmagnetic thermal conducting laminations are interposed between said predetermined ones of said electromagnetic laminations at equal intervals along said electromagnetic core.

11. In an electrical machine as in claim 9, the improvement wherein said number of solid nonmagnetic thermal conducting laminations are interposed between said predetermined ones of said electromagnetic laminations at unequal intervals along said electromagnetic core.

12. In an electrical machine as in claim 10 or 11, the improvement wherein several of said solid nonmagnetic thermal conducting laminations are coaxially disposed adjacent to one another and are interposed between said predetermined ones of said electromagnetic laminations.

13. In an electrical machine as in claim 9, the improvement which further includes coolant means for circulating a coolant liquid through said coolant ports.

14. An electrical machine as in claim 9, in the form of an electrical power generator.

15. An electrical machine as in claim 9, wherein said solid thermal conducting laminations have essentially the same thickness as said core laminations.

16. An electrical power generator comprising:

a rotor;

a stator surrounding said rotor and having an electromagnetic core composed of a plurality of magnetic core laminations coaxially stacked adjacent to one another, and cooling means operatively associated with said stator for dissipating heat therefrom, wherein said cooling means includes;

(i) a number of solid thermal conducting laminations coaxially interspersed between predetermined pairs of said magnetic core laminations, said thermal conducting laminations having a thermal conductance that establishes preferential solid radial thermal conducting paths;

(ii) a thermal collector sleeve surrounding said solid thermal conducting laminations in thermally conducting communication therewith, said thermal collector sleeve defining coolant ports through which a coolant fluid may circulate so as to remove heat therefrom.

17. An electrical power generator as in claim 16, wherein said solid thermal conducting laminations are formed of a nonmagnetic material.

18. An electrical power generator as in claim 17, wherein said thermal collector sleeve is formed of a nonmagnetic material.

19. An electrical power generator as in claims 17 or 18, wherein said nonmagnetic material is copper.

20. An electrical power generator as in claim 16, wherein said number of solid thermal conducting laminations are interposed between said predetermined pairs of core laminations at equal intervals along said electromagnetic core.

21. An electrical power generator as in claim 16, wherein said solid number of thermal conducting laminations are interposed between said predetermined ones of said core laminations at unequal intervals along said electromagnetic core.

22. An electrical power generator as in claim 20 or 21, wherein several of said solid thermal conducting laminations are coaxially disposed adjacent to one another and are interposed between said predetermined ones of said electromagnetic laminations.

23. An electrical power generator as in claim 16, further comprising fluid cooling means for circulating a coolant liquid through said coolant ports.

24. An electrical machine comprising an electromagnetic core defining a longitudinal axis, and cooling means for cooling said core by conducting heat generated during operation of said machine generally radially from one region of said core to another region thereof and for removing said conducted heat from said core at said another region, said cooling means including:
  (i) a number of solid radially disposed thermal conducting members spaced-apart from one another along the longitudinal axis of the core to establish respective preferential solid paths of thermal conductance between said one and another regions;
  (ii) a thermal collector positioned at said another region of said core and being in thermally conducting communication with said number of solid thermal conducting members for collecting heat conducted by said thermal conducting members to said another region of said core; and
  (iii) a coolant passageway defined in said thermal collector and adapted to allow a coolant fluid to circulate therethrough to remove said collected heat from said thermal collector, whereby said core is cooled.

25. An electrical machine as in claim 24, wherein said electromagnetic core is comprised of a number of electromagnetic core laminations coaxially stacked adjacent to one another along said core longitudinal axis, and wherein said solid radially disposed thermal conducting members are comprised of a number of thermal conducting laminations interposed between predetermined ones of said core laminations.

26. An electrical machine as in claim 25, wherein said number of thermal conducting laminations are interposed between said predetermined ones of core laminations at equal intervals along said core.

27. An electrical machine as in claim 25, wherein said number of nonmagnetic thermal conductance laminations are interposed between said predetermined ones of core laminations at unequal intervals along said electromagnetic core.

28. An electrical machine as in claim 26 or 27, wherein several of said thermal conducting laminations are coaxially disposed adjacent to one another and are interposed between said predetermined ones of said core laminations.

29. An electrical machine as in claim 24, wherein said solid thermal conducting members are nonmagnetic.

30. An electrical machine as in claim 24, wherein each of said solid thermal conducting members and said thermal collector is fabricated from the same nonmagnetic material.

31. An electrical machine as in claim 30, wherein said nonmagnetic material is copper.

32. A method of cooling an electrical machine of the type having an electromagnetic core made up of a number of coaxially stacked core laminations, comprising:
  providing a number of nonmagnetic thermal conducting laminations to establish a number of radially disposed solid thermal conductance paths of preselected thermal conductivity spaced apart from one another along a longitudinal axis of said core, and allowing heat to be radially preferentially conducted from one region of the core to another region thereof;
  interposing said number of nonmagnetic thermal conducting laminations between predetermined ones of said core laminations;
  establishing thermally conducting communication between the core and a thermal collector so that heat radially preferentially conducted along said solid thermal conductance paths is collected thereat; and
  circulating a coolant fluid through the thermal collector so as to remove the collected heat therefrom.

33. A method as in claim 32, wherein said thermal conducting laminations are interposed at equal intervals along said core.

34. A method as in claim 32, wherein said thermal conducting laminations are interposed at unequal intervals along said core.

* * * * *